United States Patent [19]
Buekers et al.

[11] Patent Number: 4,761,052
[45] Date of Patent: Aug. 2, 1988

[54] OPTICAL FIBRE SPLICE CASE

[75] Inventors: Valere Buekers, Zelem-Halen; Joris Franckx, Bonheiden, both of Belgium

[73] Assignee: N. V. Raychem S.A., Kessel-lo, Belgium

[21] Appl. No.: 946,393

[22] Filed: Dec. 23, 1986

[30] Foreign Application Priority Data

Jan. 31, 1986 [GB] United Kingdom ............... 8602425

[51] Int. Cl.⁴ .............................................. G02B 6/36
[52] U.S. Cl. ............................. 350/96.20; 350/96.10; 350/96.21
[58] Field of Search ................ 350/96.20, 96.21, 96.22

[56] References Cited

U.S. PATENT DOCUMENTS

| | | | |
|---|---|---|---|
| 4,359,262 | 11/1982 | Dolan | 350/96.20 |
| 4,428,645 | 1/1984 | Korbelak et al. | 350/96.20 |
| 4,498,732 | 2/1985 | Campbell et al. | 350/96.21 |
| 4,601,536 | 7/1986 | Guazo | 350/96.20 |
| 4,619,499 | 10/1986 | Gerber | 350/96.20 |
| 4,664,471 | 5/1987 | Mignien et al. | 350/96.22 X |

FOREIGN PATENT DOCUMENTS

| | | |
|---|---|---|
| 0043570 | 7/1981 | European Pat. Off. |
| 0074516 | 4/1984 | Japan .................. 350/96.20 |
| 1155470 | 11/1966 | United Kingdom . |
| 1431167 | 9/1972 | United Kingdom . |
| 1604981 | 5/1978 | United Kingdom . |
| 1604986 | 5/1978 | United Kingdom . |
| 1604985 | 5/1978 | United Kingdom . |
| 2059873 | 9/1980 | United Kingdom . |
| 2069773 | 2/1981 | United Kingdom . |
| 2124439 | 7/1983 | United Kingdom . |
| 2135632 | 1/1984 | United Kingdom . |

*Primary Examiner*—William L. Sikes
*Assistant Examiner*—Akm E. Ullah
*Attorney, Agent, or Firm*—Dennis E. Kovach; Herbert G. Burkard

[57] ABSTRACT

Two optical fibres are spliced together, and the splice and a loop of fibre organized in an organizer, for example by securing the splice in a projection (11) and accommodating the loop in a tray (12). The organizer also comprises an engagement means for example cylindrical extensions (13) into engagement with which a heat recoverable sleeve (not shown) surrounding the organizer and splice can be recovered to enclose the splice.

18 Claims, 4 Drawing Sheets

PRIOR ART

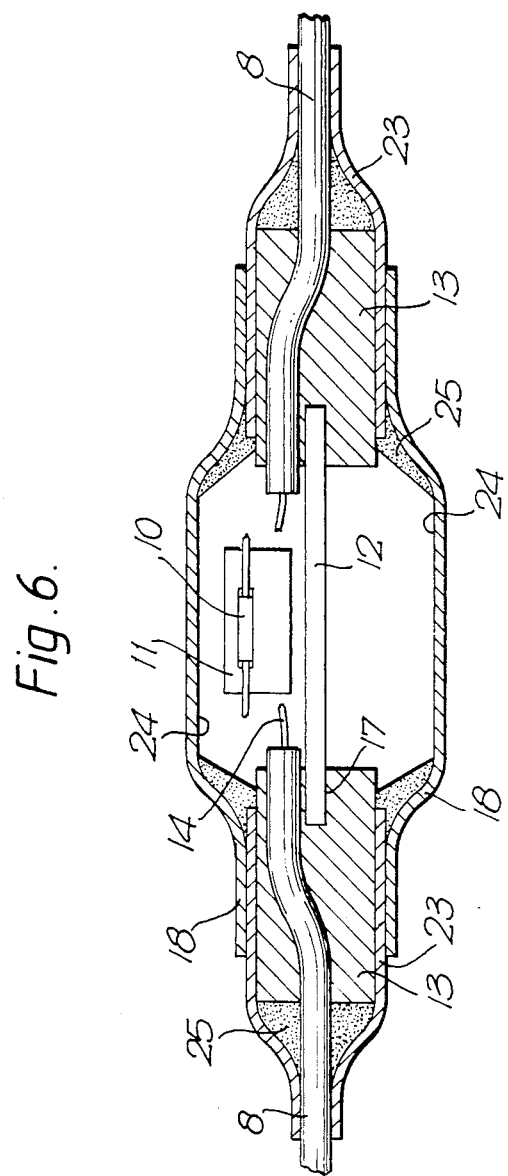

OPTICAL FIBRE SPLICE CASE

BACKGROUND OF THE INVENTION

The present invention relates to an organizer for a splice between optical fibre cables that can be used with simple dimensionally-recoverable sleeves to form a splice case.

Whilst dimensionally-recoverable, generally heat-shrinkable sleeves, have become widely used for sealing splices between copper conductor cables, they have not so far become accepted for optical fibre closures. One problem is that an optical fibre splice must be provided with an organizer (a term well understood in the art) for storing in an accessible fashion the individual fibre splices and for storing loops of fibre in order that the splice may be made a short distance, a few metres generally, away from the cables to be spliced. The spare lengths of fibre either side of the fibre splice must therefore be accommodated in the splice case. The presence of the organizer means that the splice case has a large diameter compared with that of the ingoing and outgoing cables. If a simple, unshaped, shrinkable sleeve is to be used it must have a correspondingly high shrinkage ratio: before recovery it must be large enough to surround the organizer, and after recovery it must be small enough at it ends to engage the ingoing and outgoing cables.

Optical fibre splice cases generally, therefore, comprise rigid housing, often of metal and generally rectangular shape, having holes in their sides through which the cables pass. The holes may bear tubular projections through which the cables pass. A small heat-shrink sleeve may be provided over each projection and the cable to seal the cable. Such a closure is disclosed in EP 0043570 (Siemens).

An alternative prior art design is shown in U.S. Pat. No. 4,428,645 (GK Technologies). Here two disc-shaped end plates are provided and the space between them closed by two half-shells which bear on the end plates. The end plates may be split, and in any case the ingoing and outgoing cables pass through holes in them. In both the Simens and GK Technologies designs the housing accommodates an organizer comprising a series of plates each of which may store one or more fibre splices and associated loops of fibre.

These types of prior art solutions are generally satisfactory but suffer from some disadvantages. For example they are not easily made wrap-around (a term well known in the art and, in contrast with tubular, meaning installable on a length of cable without requiring access to a free cable end) without the risk of leak paths. They tend not to be adaptable to different numbers or sizes of spliced cables. Also the quality and reliability of seal may not be high, and entirely different components and techniques from those familiar in connection with copper are required. We have now devised a simple organizer that allows a splice case to be made using standard dimensionally recoverable sleeves.

SUMMARY OF THE INVENTION

Thus, the invention comprises a method of enclosing a splice between optical fibre cables, which comprises:
splicing one or more fibres of the cable;
organizing the splice and a loop of fibre on an organizer, said organizer comprising engagement means into engagement with which a recoverable article can be recovered to form an environmental seal that surrounds at least one of the cables;
surrounding the organizer with a recoverable article; and
recovering the article into engagement with the engagement means.

The invention also provides an optical fibre organizer having means for securing an optical fibre splice, means for accomodating a loop of fibre, and engagement means with which a recoverable article can be recovered to form an environmental seal that surrounds at least one of the cables.

The invention also provides an assembly comprising the organizer and a recoverable article.

The engagement means preferably comprises at least one extension to the organizer that can be used effectively to increase the size of the cables around which the article is to be recovered. The engagement means preferably has an entirely convex surface so that a recoverable article comprising a heat-shrinkable sleeve can shrink into tight engagement with it. For example in a first embodiment the engagement means may comprise a generally cylindrical extension at one or each end of the organizer which extension may be positioned to lie alongside the spliced cables. The surrounding shrinkable sleeve must now shrink down to seal to a pair of generally cylindrical articles (the cable and the extension) side-by-side. Their combined size will be greater than that of the cable alone, thus requiring a recoverable sleeve of smaller recovery ratio than would otherwise be required.

In this embodiment we prefer that some means be provided, preferably supplied as part of the assembly, by means of which a seal may be ensured between the cable and extension that lie generally side-by-side. Although the cable and extension may each have entirely convex surfaces (for example circular) there will be a concave crutch region between them and the surrounding sleeve which must be sealed if a leak path into the splice case is to be avoided.

We prefer that this crutch region be sealed by a method using a branch-off clip as disclosed and claimed in GB No. 1,604,981 (N. V. Raychem S.A.) and/or GB No. 1,604,986 (N. V. Raychem S.A.) In some instances the method of GB No. 1,604,985 (N. V. Raychem S.A.) may be used. In the preferred of these methods a branch-off seal is formed between a heat-shrinkable sleeve and at least two substrates (here the cable and the means for engagement) by a method that comprises, in any suitable order, the steps of:

(a) positioning a clip having at least two elongate legs on the heat-shrinkable sleeve at an open end thereof, with at least two of said legs being positioned externally of the sleeve so as to form at least two terminal conduits;

(b) positioning the substrate within the conduits; and (c) applying heat so as to effect shrinkage and to form the desired seal.

The clip may comprise three (or more) legs where one of the legs is positioned within the sleeve between the two substrates. This may be desirable to form an improved seal and to reduce the chance of the clip "milking-off" the sleeve during shrinkage. The clip may comprise a heat-conductive material such that heat directed against the outside of the sleeve, primarily perhaps to cause heat-shrinkage, causes heat to be conducted via the outer legs of the clip into the inner leg within the sleeve there to actuate a heat-activatable sealing material that may be provided. The centre leg itself may comprise a heat-activatable sealant, for example a hot-melt adhesive. Some means may be provided for increasing heat-conduction along the inner leg where it consists essentially of sealing material. We prefer however that the inner leg comprises a metal, preferably integral with the outer legs, such inner leg being coated with the sealing material.

An alternative technique of sealing the crutch region between the cable and the engagement means is disclosed and claimed in GB No. 2,124,439 (N. V. Raychem S.A.). Here a flexible seal is installed around or between the cable and engagement means and a filling material of the seal allowed or caused to harden. The recovering sleeve deforms the seal so that it conforms to the surfaces of the cable and engagement means.

In a second embodiment, the engagement means may again be a generally cylindrical extension to the organizer but here it surrounds the cable, i.e., it is hollow and the cable passes through it. The diameter of the engagement means will of course be larger than that of the cables. The recoverable article now recovers into engagement with, and generally only with, the engagement means. Some means will in general be required to seal the engagement means to the cable since otherwise a leak path may exist between them. Such means may comprise a recoverable article, for example a heat-shrinkable sleeve, that extends from the engagement means in one or both directions down onto the cable that passes through it.

The recoverable article provided as part of the assembly of the invention is preferably a heat-shrinkable sleeve, especially a wrap-around heat-shrinkable sleeve. A wrap-around sleeve will preferably have some means at opposing edge portions that can be secured together to maintain the sleeve in a wrapped-around configuration. Thus the sleeve is wrapped around the cable, avoiding the need for a free end to the cable and saving space otherwise required for sliding along the cable, held in the wrapped configuration by the closure means, and then recovered. The closure means preferably comprise upstanding protrusions, known as rails, over which a channel can be slid. Such a wrap-around sleeve is disclosed and claimed in GB No. 1,155,470 (Raychem Corporation).

Where the sleeve is likely to be subjected to internal pressurization or severe mechanical wear, it may be desirable to employ a composite material, recoverable by means of recoverable fibres thereof. Such a sleeve may comprise a recoverable fabric and a matrix material as disclosed and claimed in GB No. 2,135,632 (Raychem Corporation).

The sleeve is preferably substantially un-shaped, i.e., it comprises simply a sheet of material having closure means at opposing edge portions and is not moulded or otherwise fashioned with cavities etc. to correspond to the shape of the article to be enclosed. It may however be in tubular for, again otherwise un-shaped and may be closed at one end where a butt splice between cables is to be sealed although this is not at present preferred.

The organizer preferably has the following features. The engagement means are preferably so positioned relative to the periphery of the organizer that the space available within the recoverable article is best made use of. If the recoverable article will be generally cylindrical when installed, and if it recovers uniformly, it will be desirable that the engagement means is positioned substantially centrally of the organizer. The organizer and the engagement means are preferably integral or joined together. The engagement means preferably extends from opposing ends of the organizer such that the overall arrangement of the splice case is in line as opposed to butt.

The organizer preferably comprises one or more trays each of which can accomodate one or more loops of fibre. Means for securing fibre splices may be part of one or more of the trays or may be separate, optionally joined to the trays. Where the means for securing is separate it may be arranged parallel to the tray or trays, but we prefer that it is held substantially perpendicular to them.

The organizer may also provide means for strain relief between the spliced cables. Such means may comprise attachment means, for example a screw connection, for attachment of strength members of the cable, generally a wire that runs centrally through the cables.

We prefer that means be provided for localizing the organizer proper (i.e., the trays or other means for securing the fibre splices and for accommodating loops of fibre) with respect to the engagement means, and therefore ultimately with respect to the ingoing and outgoing cables. Such means for localizing may comprise the integral nature of the means for engagement and the rest of the organizer, or it may comprise some form of connection between them. For example the means for engagement may have one or more slots into which one or more trays may be inserted.

Where further protection of the cable splice is preferred a liner may be provided. Such a liner may surround the organizer, and the recoverable article may then be recovered around it. The liner may comprise metal, especially aluminium, a plastics material, especially polypropylene or a fibrous sheet material, especially cardboard. The liner is preferably wrap-around, and preferably in the form of a roll of material or as substantially rigid half-shells. Means is preferably provided to provide a smooth transition from the larger central region, accommodating the organizer proper, down to the smaller end regions where the overlying sleeve engages the engagement means and optionally the cables. The liner may incorporate a heat barrier, such as a foam, and/or a moisture vapour barrier such as a sheet of a metal such as aluminium. Examples of suitable liners are disclosed and claimed in GB No. 2,059,873 (N. V. Raychem S.A.), GB No. 2,069,773 (N. V. Raychem S.A.) and GB No. 1,431,167 (N. V. Raychem S.A.).

BRIEF DESCRIPTION OF THE DRAWINGS

The invention is further illustrated with reference to the accompanying drawings:

FIG. 6 shows an installed splice case employing an organizer of a second embodiment of the invention;

FIG. 1 shows a prior art design of splice case such as that disclosed in U.S. Pat. No. 4,428,645 (GK Technologies Inc). This design comprises end plates, to which are attached organizers 2a and 2b that are hinged together, and are illustrated in an open position. The optical fibre splice may be stored in part 2b, and loops of fibre are stored in part 2a to enable removal of a splice away from the case. Half-shells 3 complete the enclosure. An optical fibre, partially shown as 4, can be seen running from part 2b to part 2a. The cables to be spliced enter the splice case end plates 1 as shown at 5, and for ease of assembly the end plates 1 may be split as shown at 6. One can see that there are many potential leak paths into the splice case and many surfaces that have to be sealed. Also, many parts are required and the design is likely to be rather expensive.

DESCRIPTION OF THE PREFERRED EMBODIMENTS

Figure 1:
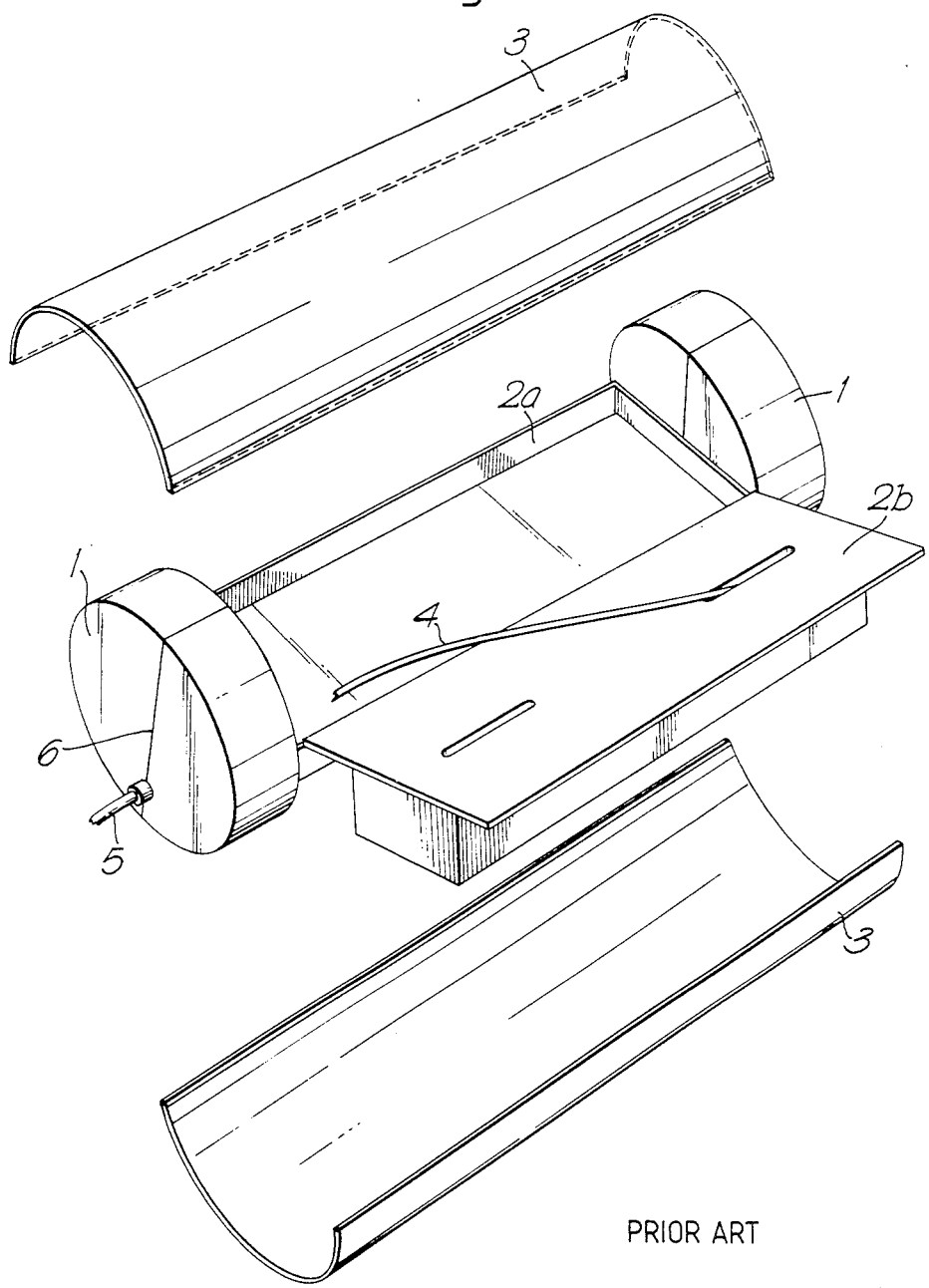
FIG. 1 shows a prior art splice case comprising end plates and half-shells.
Figure 2:
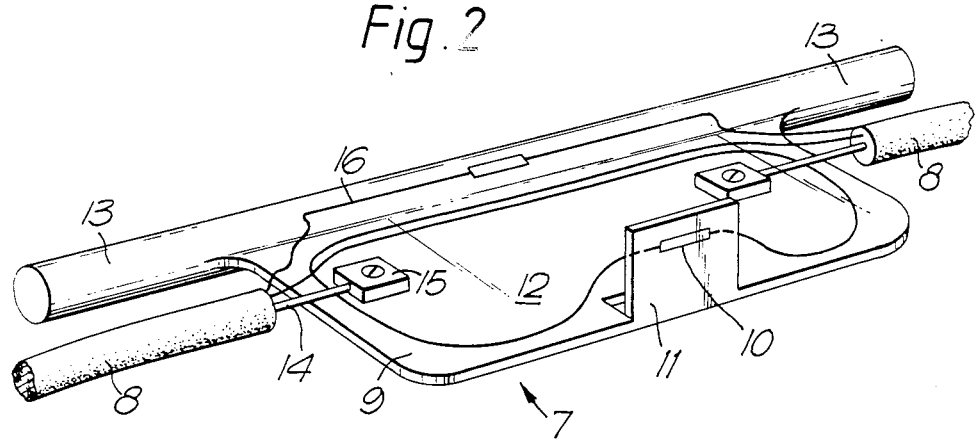
FIG. 2 shows a first embodiment of an organizer of the invention with cables attached thereto.
Figure 3:
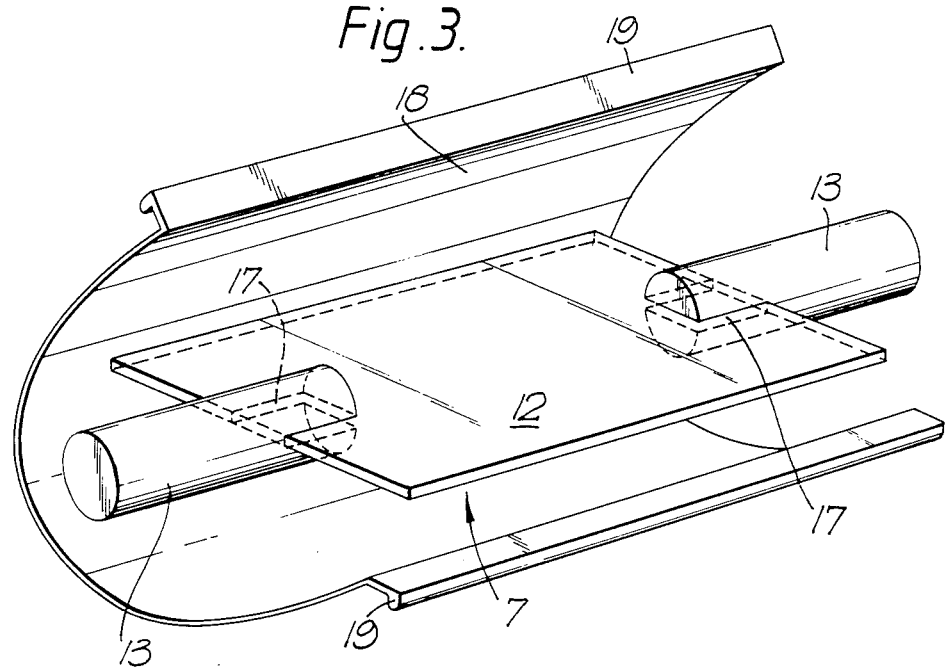
FIG. 3 shows a variation of the first embodiment.

A first embodiment of an organizer 7 of the invention is shown in FIG. 2. Two optical fibre cables 8 enter the organizer and loops of individual fibres or groups of fibres 9 are shown spliced at 10. The organizer means 12 comprises means 11 for securing a splice and for accommodating loops of fibre. The means 12 may comprise one or more trays, 12 that may be hinged to a support member or to one another. The organizer also includes means for engagement 13, which in the embodiment illustrated comprises extensions, preferably substantially cylindrical from each end of the tray 12. Where more than one tray 12 is provided, the means 13 may extend from a support to which the trays are attached. The tray 12 and means 13, comprising an elongate member, are shown integral, but they may be separate, preferably attached to one another. The means 13 is shown positioned at one edge of the tray 12, but it may be near the centre in which case the loops may run over both sides of the tray, or different loops be localized on each side. One way in which separate tray 12 and means 13 may be interconnected or attached is shown in FIG. 3. Here a slot 17 in means 13 accepts the tray 12. In this case the means 13 is preferably near the centre of the tray 12 as illustrated.

FIG. 3 also shows a wrap-around heat-shrinkable sleeve 18 partially wrapped around the organizer 7. The sleeve has closure members 19 in the form of rails at opposing edges. If desired, one of the closure members 19 may be set back from the extreme edge of the sleeve to provide a flap which may underlie the members 19 when brought together. When the members 19 are brought together a channel or other device (not shown), preferably C-shaped in cross-section, may be slid longitudinally over them to hold them together. The sleeve is then shrunk down to engage the engagement means 13 and the ingoing and outgoing cables (not shown). Thus, a closed splice case is formed around the spliced fibres, protecting them from the environment. The sleeve 18 may be coated on its internal surface with a sealing material, such as a sealant, for example a mastic or an adhesive, for example a hot-melt adhesive. The sleeve may be recoverable over its entire surface, or end portions only may be radially recoverable for engagement with the means 13 and the cables. The sleeve may be electrically heat-shrinkable, in which case it may incorporate an electrical heater, particularly a self-regulating electrical heater comprising a conductive polymer composition. The heater may be arranged so as to heat only those parts which require heating, for example the end portions as referred to above.

Figure 4:
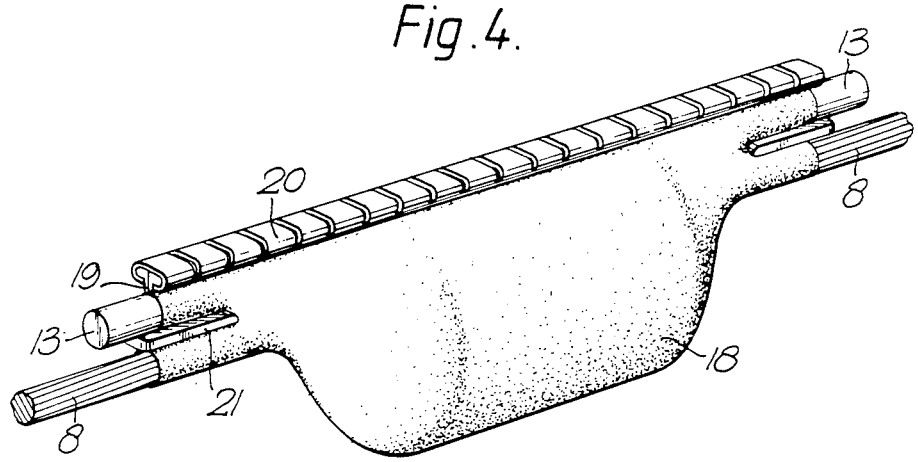
FIG. 4 shows the organizer of FIG. 2 enclosed within a heat-shrink sleeve.

FIG. 4 shows an installed splice case employing an organizer similar to that of FIG. 2 and a heat-shrinkable sleeve as shown in FIG. 3. The closure members 19 are held together by a channel 20. Branch-off seals between the members 13 and cables 8 have been formed using branch-off clips 21 as disclosed in GB Nos. 1,604,981 or 1,604,986.

The members 13 may be seen not only to act as a cable build up, allowing sleeves of low recovery ratio to be used, but also to locate the organizer with respect to the cables 8 and the sleeve 18.

If desired, the clip 21 may be fixed to or integral with the organizer or with the means 13. This reduces the number of components required for assembly but may make installation of the sleeve between the legs of the clip difficult. Such difficulty may, however, be avoided if the clips, although attached to the organizer or means 13, can be slid longitudinally with respect to them. For example, the clip may be rigidly attached to the member 13 and the member 13 slidable with respect to the organizer. Thus, the means 13 plus clip 21 are initially in their extended position, the sleeve is wrapped around the organizer, and the means 13 plus clip 21 are slid inwardly to trap the sleeve between the legs of the clip. The crutch region within the sleeve between the means 13 and cable 8 is preferably sealed with a sealing material for example a hot-melt adhesive or a mastic. The sealing material may be applied separately or it may be provided initially as an internal coating on the sleeve or on (or at least as part of) an inner leg of the clip 21.

Figure 5:
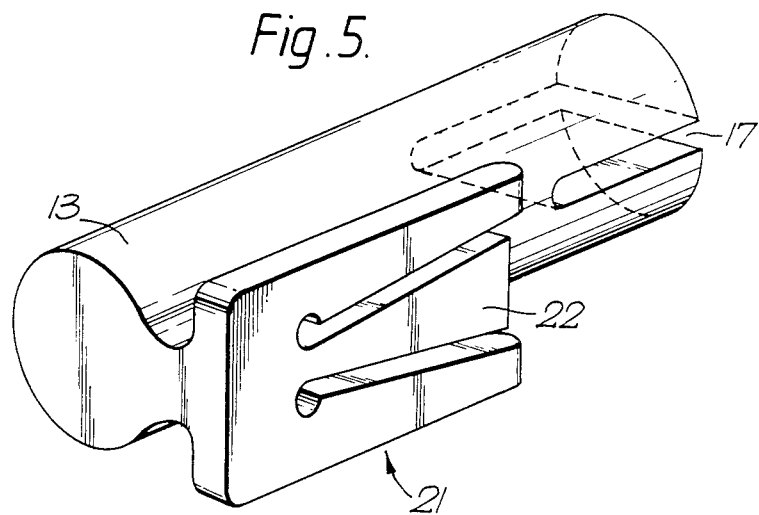
FIG. 5 shows a combined clip and engagement means.

FIG. 5 shows one way in which a clip 21 can be integral with or attached to a means 13, and analogous techniques may be used to attach it to a tray 12 or other part of an organizer. The clip 21 here is a three legged clip having an inner leg 22 that comprises a sealing material, preferably comprises a heat-conducting inner part coated with a hot-melt adhesive. The clip plus means 13 is positioned on a tray 12 or another part of the organizer 7 so that the tray extends partly into slot 17. Then the sleeve is wrapped around and closed with a channel if appropriate. Then the means 13 is pushed further onto the tray such that the tray extends further into slot 17. This operation results in the sleeve passing through the gaps between the legs of the clip, thereby forming a branch-out at the end of the sleeve. The sleeve is shrunk to form the desired seal. Other sliding arrangements than the slot 17 could be used if desired. The clip may simply be bonded or to otherwise attached to means 13, or it could be slidably engagable with it.

In FIG. 6 the means 13 are substantially concentric with the cable 8, and in this embodiment a branch-off clip 21 need not be used. The cables pass through means 13, and means 13 are sealed to the cables by means such as recoverable sleeves 23. The outer sleeve 18 that forms the major part of the splice case then is shrunk down to engage sleeve 23 or means 13. In this Figure a liner 24 is shown provided to give mechanical protection or heat protection or to provide a moisture vapour barrier. The liner has tapered ends, preferably formed by means of a series of circumferentially arranged tapering fingers that can bend inwardly. Adhesive 25 seals any voids that remain. In the embodiment illustrated the tray 12 extends perpendicular to the plane of the paper and the means 11 for securing splice 10 lies in the plane of the paper. The splice case is not cylindrical but is oval or flat in cross-section, being of greater dimension perpendicular to the paper. This need not however be so. The means 13 can be seen to build up the diameter of the cable 8 and also to locate the organizer.

The methods and articles of the invention are particularly useful for optical fibre cables containing from 6–50, especially 12–24 fibres, and having a diameter of 5–20, especially 10–12 mm. The trays or other means for accomodating preferably have locating flanges and can preferably store coils of fibre at a bend radius of at least 20, more preferably at least 35 especially at least 50 mm. Standard organizers, for example that preferred by the Deutche Bundespost, may be used. Where the cable diameters are small it may be desirable to provide cable over heat protection to avoid damage during heat-installation. Such protection may comprise a wrap of a backing plus adhesive that is installed around the cable at the region and where the outer sleeve is to engage it. The invention finds particular use in the splicing of cables containing fibres within tubes, known in the art as a loose tube construction. A typical organizer size employs trays of from 10–50, preferably 15–40, especially 15–30 cm in length and 5–300 preferably 5–20 especially 5–15 cm in width. The engagement means is preferably generally circular in cross-section of diameter 2–10, preferably 2–8 especially 3–7 cms.

For the avoidance of doubt it is here stated that the invention provides a method and various components for making a cable splice case where an organizer or part of it can be encased by means of a simple, plain, dimensionally-recoverable sleeve. The method and components may incorporate any one or more of the features disclosed herein. For example any one or more of the organizer types, tray types, sleeve types, clip types, liner types, or sealing material types may be selected.

We claim:

1. An optical fibre assembly for enclosing a splice between optical fibre cables, comprising:
    means for securing the optical fibre splice;
    means for accommodating a loop of fibre, the accommodating means including at least one substantially flat fibre organizing tray;
    means for engaging a recoverable article that can be recovered to form an environmental seal that completely surrounds the tray; and
    a recoverable article recovered so as to completely surround the accommodating means while maintaining the tray in a substantially flat attitude.

2. An assembly according to claim 1, the engaging means comprising an elongate member extending from the accommodating means, the elongate member having a size sufficiently large so as to significantly reduce a necessary shrinkage ratio of the recoverable article.

3. An assembly according to claim 1, the recoverable article comprising a heat-shrinkable wraparound sleeve.

4. An assembly according to claim 1, further comprising a branch-off clip which together with the recoverable article forms a seal between the engaging means and at least one of the cables.

5. An assembly according to claim 3, further comprising and a liner.

6. An optical fiber assembly according to claim 1, engaging means having a portion thereof arranged side-by-side with at least one of the cables so as to be substantially parallel and offset therefrom.

7. An optical fiber assembly according to claim 1, the recoverable aticle being recovered so as to form a seal against the engaging means and at least one optical fiber cable having an optical fiber therein connected to the optical fiber splice.

8. An optical fiber assembly according to claim 6, the recoverable article being recovered so as to form seals at first and second end sections of the engaging means and the cables.

9. An optical fiber assembly according to claim 7, the engaging means comprising at least one cylindrical member.

10. A method of enclosing a splice between optical fibre cables, comprising the steps of:
    organizing the splice and a loop of fibre on an organizer, said organizer comprising at least one substantially flat fibre organizing tray and means for engaging a recoverable article that can be recovered to form an environmental seal that completely surrounds the organizer;
    completely surrounding the organizer with the recoverable article; and
    recovering the article so as to maintain the tray in a substantially flat attitude.

11. A method according to claim 10 the engaging means locating the organizer relative to the recoverable article.

12. A method according to claim 10, the engaging means comprising an elongate member that extends parallel to the cables.

13. A method according to claim 12, further comprising the step of positioning a branchoff clip on an open end of the recoverable article to form therein at least two terminal conduits, such that one can contain the elongate member and one can contain at least one of the cables.

14. A method according to claim 10, the recoverable article having a hot-melt adhesive thereon, and further comprising the step of activating the adhesive.

15. A method according to claim 10, the engaging means comprising at least one cylindrical member.

16. A method according to claim 10, the engaging means having a portion thereof arranged side-by-side with at least one of the cables so as to be substantially parallel and offset therefrom and further comerising the step of splicing one or more fibers of the cable.

17. A method according to claim 16, the article being recovered so as to form a seal against the engaging means and at least one of the optical fiber cables.

18. A method according to claim 16, the recoverable article being recovered so as to form seals at first and second end sections of the engaging means in the optical fiber cables.

* * * * *